US005850188A

United States Patent [19]

Doyle et al.

[11] Patent Number: 5,850,188

[45] Date of Patent: Dec. 15, 1998

[54] SELF-DIAGNOSING REMOTE ENTRY APPARATUS

[75] Inventors: Paul C. Doyle, Northville; David W. Gottschalk, Warren, both of Mich.

[73] Assignee: United Technologies Automotive, Inc., Dearborn, Mich.

[21] Appl. No.: 763,195

[22] Filed: Dec. 10, 1996

[51] Int. Cl.[6] ............................ G08C 19/00; G01S 13/00

[52] U.S. Cl. ................................ 340/825.69; 340/825.31; 341/176; 307/10.5

[58] Field of Search ......................... 340/825.69, 825.72, 340/825.31, 426; 341/176; 307/10.5, 10.2; 324/384, 402, 379, 380

[56] References Cited

U.S. PATENT DOCUMENTS

| | | | |
|---|---|---|---|
| 4,692,762 | 9/1987 | Lewiner et al. | 340/825.69 |
| 4,737,784 | 4/1988 | Hirano | 340/825.69 |
| 4,797,671 | 1/1989 | Toal, Jr. | 340/825.69 |
| 4,887,064 | 12/1989 | Drori et al. | 340/825.31 |
| 4,904,993 | 2/1990 | Sato | 340/825.69 |
| 5,146,215 | 9/1992 | Drori . | |
| 5,204,663 | 4/1993 | Lee | 340/825.31 |
| 5,285,186 | 2/1994 | Chen | 307/10.2 |
| 5,363,448 | 11/1994 | Koopman, Jr. et al. . | |
| 5,365,438 | 11/1994 | Mitchell et al. | 324/380 |
| 5,442,341 | 8/1995 | Lambropoulos . | |
| 5,471,668 | 11/1995 | Soenen et al. | 340/825.72 |
| 5,517,189 | 5/1996 | Bachhuber et al. | 340/825.69 |
| 5,627,529 | 5/1997 | Duckworth et al. | 340/825.69 |
| 5,650,774 | 7/1997 | Drori | 340/825.69 |

*Primary Examiner*—Edwin C. Holloway, III
*Assistant Examiner*—Edward Merz
*Attorney, Agent, or Firm*—Niro, Scavone, Haller & Niro

[57] ABSTRACT

A remote keyless entry apparatus is disclosed for use with a vehicle. The apparatus includes a receiving unit disposed within the vehicle and a key fob transmitter for transmitting a plurality of signals to the receiving unit. The transmitter includes a transmitting unit for transmitting the plurality of signals to the receiving unit, a control unit operatively connected to the transmitting unit for controlling transmission of the plurality of signals and a diagnostic gathering and storage unit electrically connected to the control unit for supplying diagnostic data to the control unit. Additionally, the transmitter includes a key fob unit selectively connected to the control unit and to the diagnostic unit. The arrangement is such that in a first operative disposition of the key fob unit, the key fob triggers the control unit so that a first signal of the plurality of signals is generated by the transmitter unit for reception by the receiving unit. In a second operative disposition of the key fob, the key fob triggers the diagnostic unit so that a second signal of the plurality of signals is generated by the transmitting unit for reception by the receiving unit. The second signal containing diagnostic information pertaining to the key fob, the receiving unit provides a diagnostic report after reception of the second signal.

16 Claims, 3 Drawing Sheets

SELF-DIAGNOSING REMOTE ENTRY APPARATUS

FIELD OF THE INVENTION

The present invention relates to a remote keyless entry apparatus for use with a vehicle. More specifically, the present invention relates to a remote keyless entry apparatus which includes a key fob transmitter having a diagnostic gathering and storage means and transmitting means.

BACKGROUND OF THE INVENTION

Many electronic modules incorporate self diagnostic functionality to report system failures and other information to the user or to an external system tester. For example, in the case of automotive modules, such modules gather and store information such as engine performance, ignition functioning, engine compression, fuel mixture and the like. Such information is useful particularly when the vehicle is to be serviced as it provides detailed information as to engine performance and how the engine can be tuned to maximize performance.

Additionally, the aforementioned self diagnostic functionality report is not only useful to the service technician for assisting in the maintenance of peak engine performance but also to the driver by the provision of general information as to the operation and safety condition of the vehicle.

It is well known in the art to provide remote keyless entry to a vehicle. U.S. Pat. No. 5,442,341, issued to Lambropoulos; U.S. Pat. No. 5,363,448, issued to Koopman, Jr. et al.; and U.S. Pat. No. 5,146,215, issued to Drori exemplify the art, and their teachings are incorporated herein by reference. Although it is well known in the art to provide remote keyless entry key fob transmitters for transmitting a signal to a vehicle for unlocking the same, the present invention provides means for extending the aforementioned arrangement to include means for gathering, storing and transmitting diagnostic information using the same data link between the key fob transmitter and a receiving unit disposed within the vehicle.

Typically, in the prior art remote keyless entry (RKE) key fob transmitters, the RKE transmits a signal which is usually a modulated radio frequency (RF) carrier or an infrared signal. Such signal is received by a receiver unit within the vehicle and the receiver unit actuates a functional load such as a door lock actuator on the driver's side door for permitting access to the vehicle.

The present invention uses the transmission path normally used only to transmit remote keyless entry functional data to additionally transmit diagnostic information. Such diagnostic information would typically include the condition of the battery cell used to energize the RKE, the operational condition of the control buttons on the RKE, or the general health of the circuitry within in light of chronic moisture and shock conditions. The diagnostic data is collected and stored by the key fob transmitter, such as in random access memory (RAM) or in erasable programmable read only memory (EEPROM). From storage, the data are sent to the receiving unit.

In normal operation, an RKE key fob transmits a command to the receiving unit contained in the vehicle when a button on the key fob is depressed by the user. The command triggers the receiving unit to send a signal to actuate a function in the automobile such as the unlock mechanism on the driver's side door. The link by which the data is transferred is usually a modulated radio frequency (RF) carrier or an infrared signal. The present invention uses the same data link to transmit diagnostic information gathered by the key fob to the receiving unit.

As stated hereinbefore, the type of diagnostic information that can be gathered and reported by the key fob transmitter includes but is not limited to low key fob battery detection, stuck or non functioning buttons on the RKE and the like. The diagnostic information is collected by the key fob transmitter and is stored therein. Such information is then sent via the data link to the receiving unit when the user depresses a further key fob button. This may occur either simultaneous with the transmission of a control signal, or subsequently, when another key fob button is pressed by the user. The exact triggering event for the transmission of the diagnostic data is a simple matter of design choice. The further key fob button can be a predetermined dedicated diagnostic button, can be a combination of buttons, or can be any command actuating button whereby the diagnostic information signal piggybacks on a command signal.

The received diagnostic information can be handled in the same manner as other diagnostic information such as by displaying the diagnostic information on a readable screen external to a vehicle, or on a panel display within a vehicle.

Therefore, it is a primary objective of the present invention to provide a remote keyless entry key fob transmitter that possesses diagnostic capabilities.

Another object of the present invention is the provision of a new and unique key fob transmitter which utilizes the transmission path normally used only to transmit RKE functional data to also transmit diagnostic information.

Other objects and advantages of the present invention will be readily apparent to those skilled in the art by a consideration of the detailed description taken in conjunction with the annexed drawing which represent a preferred embodiment of the present invention.

SUMMARY OF THE INVENTION

The present invention relates to a remote keyless entry apparatus for use with a vehicle. The apparatus includes a receiving unit which is disposed within the vehicle. A key fob transmitter transmits a plurality of signals to the receiving unit. The transmitter includes transmitting means for transmitting a plurality of signals to the receiving unit. Control means are operatively connected to the transmitting means for controlling transmission of the plurality of signals.

Diagnostic gathering and storage means are electrically connected to the control means for supplying diagnostic data to the control means. Key fob means are selectively connected to the control means and to the diagnostic means. The arrangement is such that in a first operative disposition of the key fob means, the key fob means triggers the control means so that a first signal (also described herein as a command signal) of the plurality of signals is generated by the transmitting means for reception by the receiving unit. In a second operative disposition of the key fob means, the key fob means triggers the diagnostic means so that a second signal of the plurality of signals is generated by the transmitting means for reception by the receiving unit. The arrangement is such that the receiving unit provides a diagnostic report upon reception of the second signal. The receiving unit includes actuating means triggered by the first signal for unlocking the vehicle.

In one embodiment of the present invention, the receiving unit also includes a display panel for displaying the diagnostic report. In another embodiment of the present invention, the receiving unit includes a data interface port for allowing received key fob diagnostic information to be output via standard automotive diagnostic data protocols to a standard off-board automotive diagnostic display unit.

In still another embodiment, the transmitting means includes link means for transferring the diagnostic data by a modulated radio frequency carrier. In a still further embodiment of the present invention, the plurality of signals are infrared signals. The diagnostic data gathered and stored indicates one or more of either a low RKE battery condition a non-functioning button on the RKE indicative of a fault condition, or a generally corrupted circuit such as from exposure to shock or moisture.

Control means includes a microprocessor or microcontroller selectively responsive to signals caused by depression of predetermined key fob buttons such that the control means generates corresponding ones of a plurality of signals.

Many variations and modifications of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims. Also, it will be appreciated by those skilled in the art that many systems are available for encoding the transmission of data such that unauthorized access to the vehicle or information pertaining to such vehicle can be prevented. It will further be appreciated by those skilled in the art that the disclosed embodiments are easily adapted to and incorporated in non-automotive applications, since any remote control transmitter will in principle be capable of transmitting self-diagnostic information for later use.

DETAILED DESCRIPTION OF THE DRAWINGS

Figure 1:
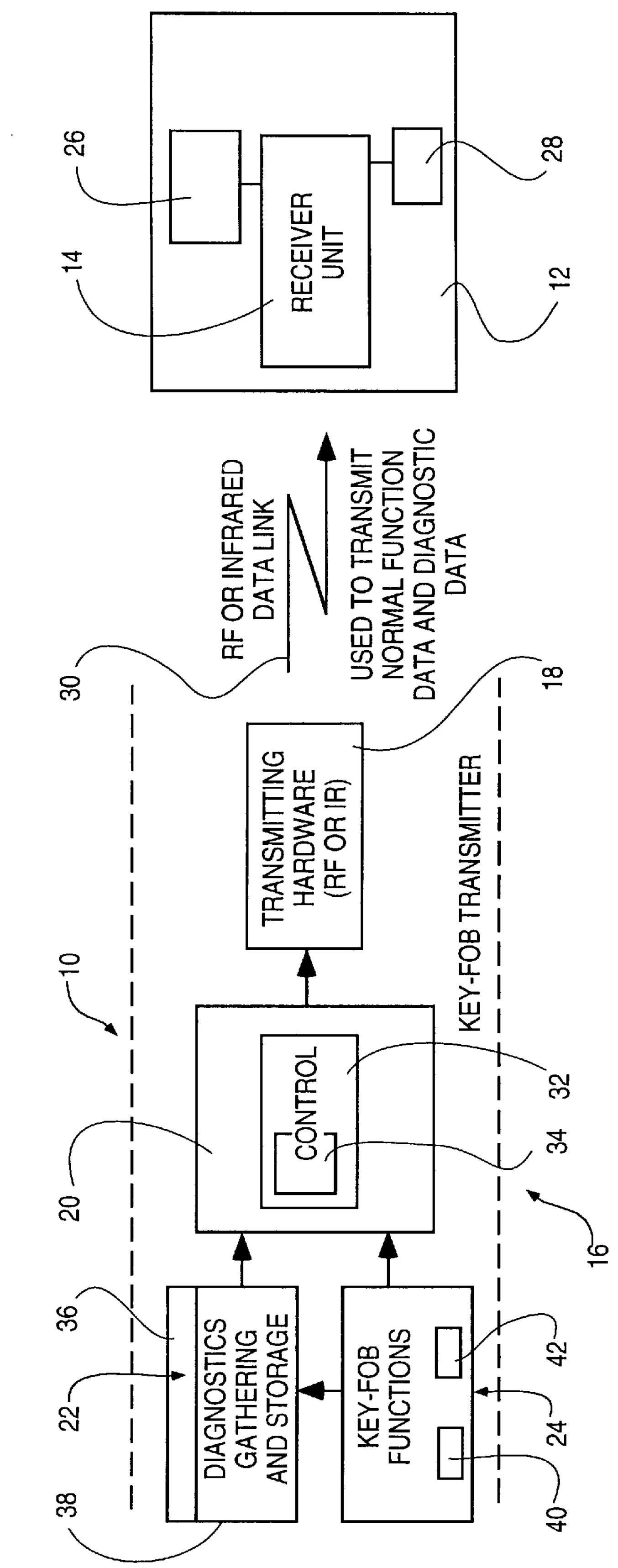
FIG. 1 is a diagrammatic representation of the remote keyless entry apparatus according to the present invention.

FIG. 1 is a diagrammatic representation of a remote keyless entry apparatus generally designated 10 for use with a vehicle 12. The apparatus 10 includes a receiving unit 14 disposed within the vehicle 12.

A key fob transmitter generally designated 16 transmits a plurality of signals to the receiving unit 14. The transmitter 16 includes a transmitting means 18 for transmitting the plurality of signals to the receiving unit 14.

Control means 20 is operatively connected to the transmitting means 18 for controlling transmission of the plurality of signals. Diagnostic gathering and storage means generally designated 22 are electrically connected to the control means 20 for supplying diagnostic data to the control means 20.

Key fob means generally designated 24 are selectively connected to the control means 20 and to the diagnostic means 22. The arrangement is such that in a first operative disposition of the key fob means 24, the key fob means 24 triggers the control means 20 so that the first signal of the plurality of signals is generated by the transmitting means 18 for reception by the receiving unit 14.

In a second operative disposition of the key fob means 24, the key fob means 24 triggers the diagnostic means 22 so that a second signal of the plurality of signals is generated by the transmitting means 18 for reception by the receiving unit 14.

The transmitting means 18 includes link means 30 for transferring the diagnostic data by means of a modulated radio frequency carrier. One such modulation technique, common to binary data transmissions, is pulse width modulation in which one pulse width (duration) represents a binary one, and another pulse width (duration) represents a binary zero. The link means 30 in a preferred embodiment of the present invention transmits both signals corresponding to the diagnostic data and the command signals. In another embodiment of the present invention, the transmitting means 18 transmits the plurality of signals which are infrared signals according to well known infrared transmission protocols.

Figure 2:
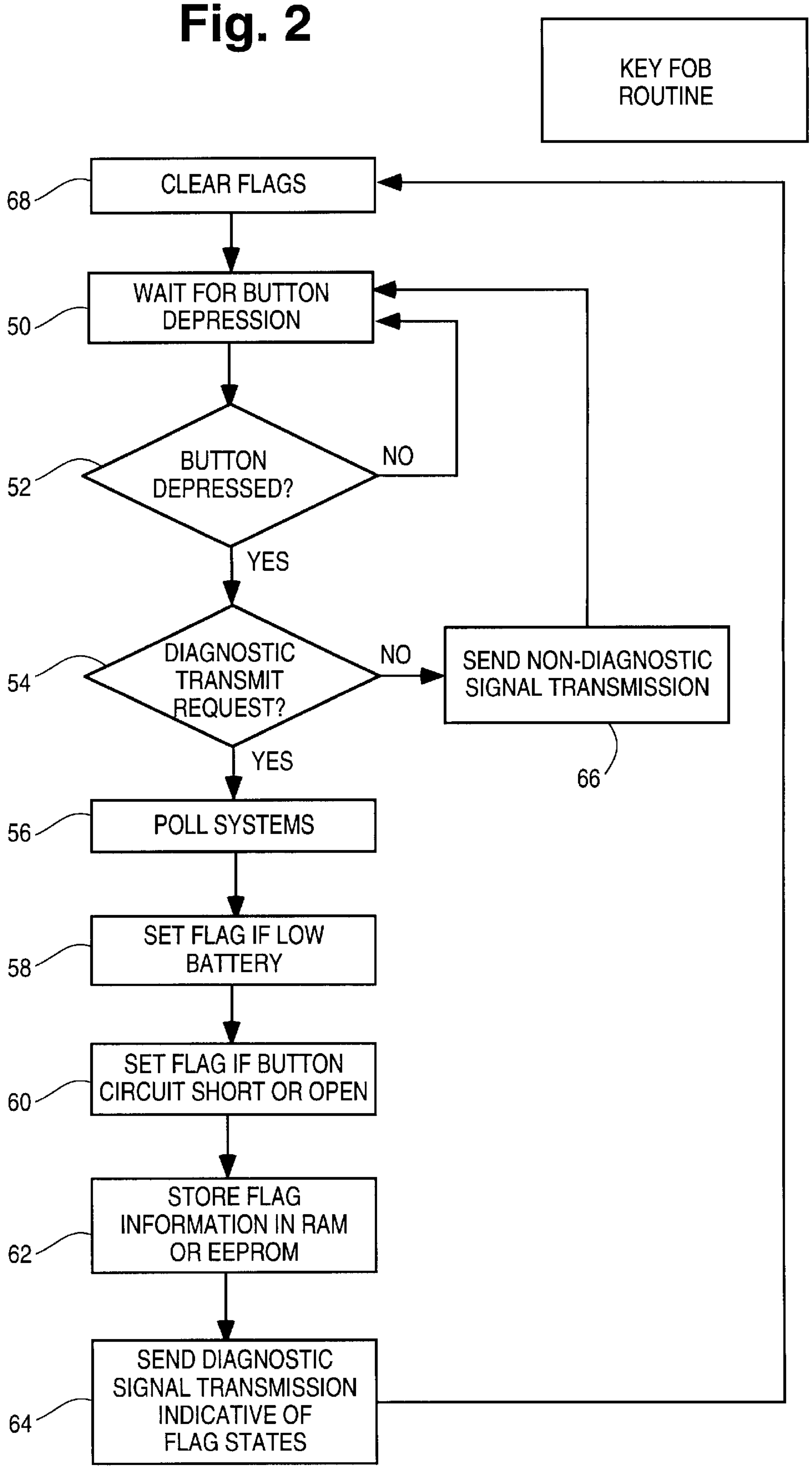
FIG. 2 is a flow chart showing the key fob control routine of a preferred embodiment.

Attention is now directed to FIG. 2, which shows a flow diagram of the control procedure within the key fob of a preferred embodiment. It will be appreciated that the coding of such a control procedure is well within the skill of the average artisan. In operation, the key fob controller awaits the depression of a button (50). The buttons are comprehended to be switches operatively coupled to the controller. As soon as a button is depressed (52), it generates a switch signal received by the controller corresponding to whichever button was depressed. If the switch signal is valid (54) but not indicative of a diagnostic signal transmission request, then it must be indicative of a command request. The routine then enables the performance of a non-diagnostic signal transmission (66), such as a command signal for opening or closing a door lock. If the switch signal is valid and is indicative of a diagnostic signal transmission request, then the following occurs. The controller polls internal systems (56), such as the fault status of command switches (62), the battery charge condition (58) or general circuit conditions, and records the results of the polling (62). If the battery is low, a flag is set. If there is a fault condition, such as an open or short circuit, a different flag is set. Such flags are contained in a status register. The status register is stored in RAM or EEPROM (preferably EEPROM because of its non-volatile nature), and from there the information is gathered and sent via the transmission means to the receiver unit (64). After transmission, flags are cleared (68) and the unit returns to a waiting mode.

Of course, flags and status registers are just one technique for programming the flow diagram represented within FIG. 2, and other techniques are well within the art. In addition, while FIG. 2 represents an embodiment wherein the command signal is separate and distinct from a diagnostic signal, such need not be the case. It is a simple matter of signal protocol for the diagnostic signal to be made to be carried at the same time as the command signal.

Returning again to FIG. 1 and turning attention to the receiving unit 14, the receiving unit 14 stores the diagnostic information transmitted by the key fob. In a preferred embodiment, the information is stored in EEPROM. Subsequently, the receiving unit may generate a diagnostic report. More specifically, the receiving unit 14 in one embodiment includes a display panel 26 for displaying the diagnostic report in which the diagnostic information may be displayed in graphical or textual form for interpretation by a user. In another embodiment, the receiving unit 14 includes a data interchange or interface port for transferring the diagnostic data to an extra-vehicular diagnostic instrument for display. Such ports already exist on most current automobiles, and work on well known data interchange protocols within the automotive industry.

Figure 3:
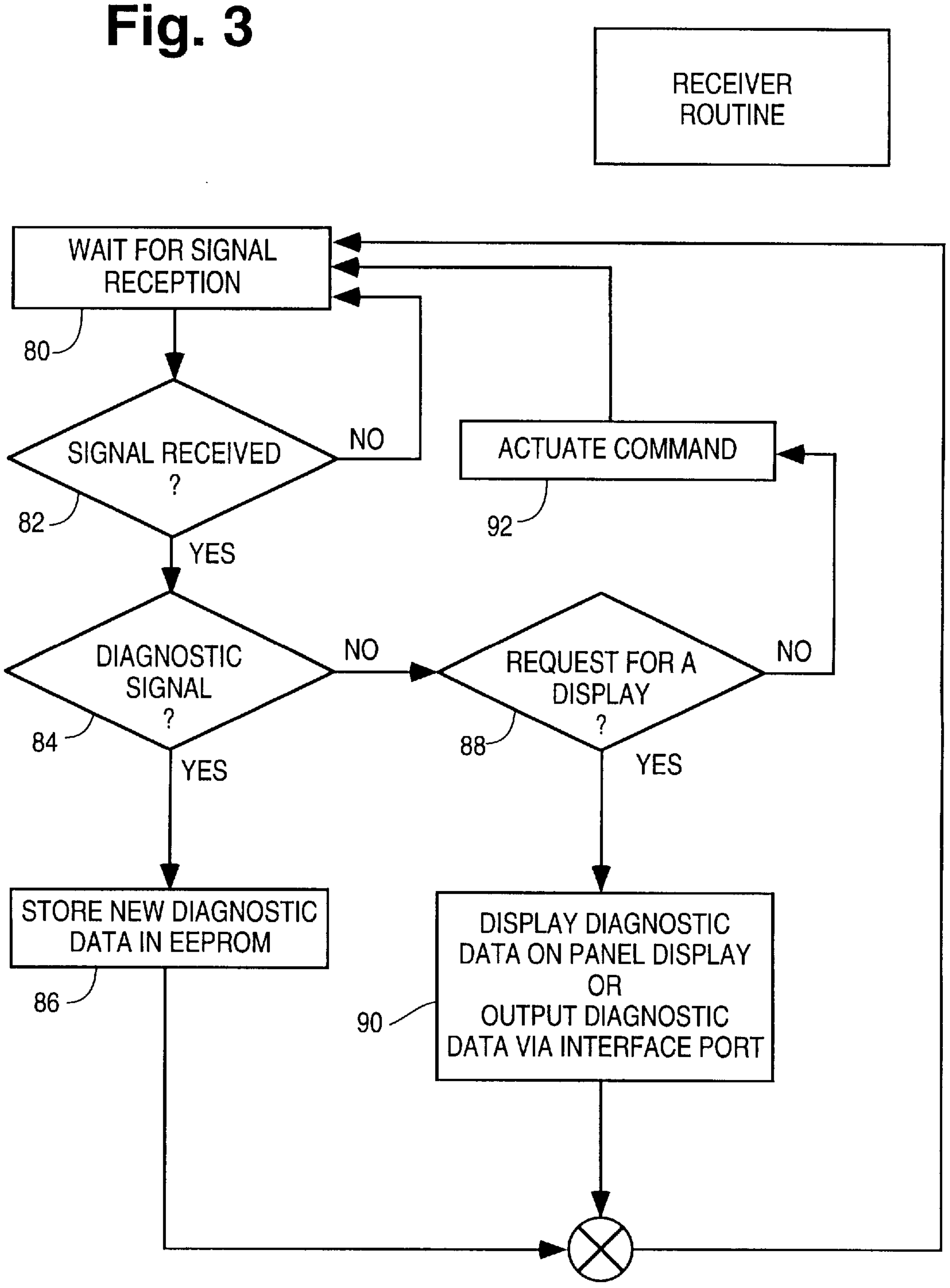
FIG. 3 is a flow chart showing the receiver control routine of a preferred embodiment.

Now addressing FIG. 3, the control routine in the receiving unit of a preferred embodiment is shown. The receiving unit waits for an infrared or RF signal (80). When a signal is received (82), its nature is checked (84). If it is a diagnostic signal, the information is stored in EEPROM for later retrieval and use (86). If not, the signal is checked to see if it is a request to display diagnostic information (88). If not, it must be a command signal, which is performed by the generation of an actuation signal (92). If it is a request for a diagnostic display, such operation is performed (90). It will be appreciated that the source of the request for a diagnostic display may itself originate in a remote signal transmission, or may rather originate at the receiving unit itself.

The present invention provides a new and unique means for utilizing the data link usually used for the transmission of a signal from a keyless fob for unlocking a vehicle door to transfer diagnostic information relative to the RKE. and for conveying such diagnostic information to a receiving unit within the vehicle.

What is claimed is:

1. A remote keyless entry apparatus for use with a vehicle, the apparatus comprising:

a receiving unit for disposing within the vehicle;

a key fob, the key fob including;

transmitting means for transmitting a plurality of signals to the receiving unit;

control means operatively connected to the transmitting means for controlling transmission of the plurality of signals;

diagnostic gathering and storage means operatively connected to the control means for supplying diagnostic data to the control means;

command input means selectively connected to the control means and to the diagnostic means, the arrangement being such that in a first operative disposition of the command input means, the command input means triggers the control means so that a first signal of the plurality of signals is generated by the transmitting means for reception by the receiving unit and in a second operative disposition of the command input means, the command input means triggers the control means so that diagnostic data is supplied to the control means and a second signal of the plurality of signals is generated by the transmitting means for reception by the receiving unit;

whereby the receiving unit may provide a diagnostic report after reception of the second signal.

2. A remote keyless entry apparatus as set forth in claim 1 wherein the receiving unit further includes:

a display panel for displaying the diagnostic report.

3. A remote keyless entry apparatus as set forth in claim 1 wherein the receiving unit further includes:

interface means for transferring the diagnostic data to extravehicular diagnostic equipment.

4. A remote keyless entry apparatus as set forth in claim 1 wherein the transmitting means includes:

link means for transmitting the diagnostic data by a modulated radio frequency carrier.

5. A remote keyless entry apparatus as set forth in claim 4 wherein the link means transmits diagnostic data by a pulse width modulated radio carrier.

6. A remote keyless entry apparatus as set forth in claim 1 wherein the transmitting means includes:

link means for transmitting the plurality of signals, the plurality of signals being infrared signals.

7. A remote keyless entry apparatus as set forth in claim 1 wherein the diagnostic data indicates a low battery condition.

8. A remote keyless entry apparatus as set forth in claim 1 wherein the diagnostic data indicates a non functioning button actuator.

9. A remote keyless entry apparatus as set forth in claim 1 wherein the first and second operative dispositions are identical.

10. A remote keyless entry apparatus as set forth in claim 1 wherein the command input means includes:

a first button actuation of which results in the generation of the first signal;

a second button actuation of which results in the generation of the second signal.

11. A remote keyless entry apparatus as set forth in claim 10 wherein the first and second buttons are the same button.

12. A remote keyless entry apparatus for use with a vehicle, the apparatus comprising:

a receiving unit for disposing within the vehicle;

a key fob, the key fob including transmitting means for transmitting a plurality of signals to the receiving unit;

control means operatively connected to the transmitting means for controlling transmission of the plurality of signals;

diagnostic gathering and storage means operatively connected to the control means for supplying diagnostic data to the control means;

command input means selectively connected to the control means and to the diagnostic means, the arrangement being such that in a first operative disposition of the command input means, the command input means triggers the control means so that a first signal of the plurality of signals is generated by the transmitting means for reception by the receiving unit and in a second operative disposition of the command input means, the command input means triggers the control means so that diagnostic data is supplied to the control means and a second signal of the plurality of signals is generated by the transmitting means for reception by the receiving unit;

the transmitting means including link means for transmitting the diagnostic data by a pulse width modulated radio frequency carrier;

whereby the receiving unit may provide a diagnostic report after reception of the second signal.

13. A system for remotely controlling an actuator operatively disposed to be responsive to selected ones of a plurality of actuation signals, comprising:

a receiving unit electrically coupled to the actuator and capable of generating an actuation signal;

a transmitting unit;

the transmitting unit including a controller;

a plurality of command switches operatively coupled to the controller for providing the controller a plurality of switch signals;

a signal generator operatively coupled to the controller for generating command signals indicative of respective ones of the plurality of switch signals;

a transmitter for transmitting to the receiving unit the command signals;

the command signals including diagnostic information.

14. A system of claim 13 wherein the diagnostic information includes one from the group consisting of battery charge status, circuit fault state and command switch fault state.

15. A method for diagnosing transmitter conditions in a remote keyless entry system comprising the steps of:

in the transmitter:

awaiting the actuation of a command switch;

upon said actuation, determining the presence of a command indicative of the transmission of transmitter diagnostic information;

upon said command, polling transmitter conditions, storing in memory data indicative of the transmitter conditions, and transmitting said data;

in the receiver:

awaiting the presence of said transmitted data; and upon receipt of said transmitted data, storing the data in receiver memory.

16. The method of claim 15 further comprising:

in the transmitter:

upon said actuation, determining the presence of a display command indicative of a request to display diagnostic information;

upon said display command, transmitting said display command;

in the receiver:

awaiting the presence of said transmitted display command;

upon receipt of said transmitted display command, displaying diagnostic data for observation by an operator.

* * * * *